United States Patent [19]

Prisco, Jr. et al.

[11] Patent Number: 4,917,807

[45] Date of Patent: Apr. 17, 1990

[54] METHOD FOR RECOVERING SOLVENT

[75] Inventors: Anthony J. Prisco, Jr., Beverly; Bruce R. Sewter, Pernherton Twp., Burlington County; William E. Briggs, Beverly; Gary L. Archer, Mount Holly, all of N.J.

[73] Assignee: Westinghouse Electric Corp., Pittsburgh, Pa.

[21] Appl. No.: 191,507

[22] Filed: May 9, 1988

Related U.S. Application Data

[62] Division of Ser. No. 832,491, Feb. 21, 1986, Pat. No. 4,770,197.

[51] Int. Cl.⁴ .......................... B01D 3/00; B01D 5/00

[52] U.S. Cl. .................................... 210/774; 210/804; 210/805; 210/806

[58] Field of Search ............... 134/105, 107, 108, 110, 134/111, 109; 68/18 R, 18 C, 18 F; 202/167, 170; 203/DIG. 11; 210/774, 790, 804, 803, 805, 806, 773

[56] References Cited

U.S. PATENT DOCUMENTS

| | | | |
|---|---|---|---|
| 1,947,174 | 2/1934 | Sando | 68/18 R |
| 2,011,083 | 8/1935 | Sando | 68/18 R |
| 2,171,698 | 9/1939 | Hetzer | 68/18 C |
| 2,400,726 | 5/1946 | Wright et al. | 68/18 C |
| 3,085,415 | 4/1963 | Gosnell | 68/18 R |
| 3,405,452 | 10/1968 | Candor et al. | 68/18 C |
| 4,119,560 | 10/1978 | Sheeline | 159/47.3 |
| 4,235,600 | 11/1980 | Capella et al. | 68/18 R |
| 4,601,181 | 7/1986 | Privat | 68/18 C |
| 4,630,625 | 12/1986 | Capella et al. | 134/111 |
| 4,676,261 | 6/1987 | Blaul | 134/111 |

FOREIGN PATENT DOCUMENTS

| | | | |
|---|---|---|---|
| 2406868 | 8/1974 | Fed. Rep. of Germany | 68/18 C |

*Primary Examiner*—Frank Sever

[57] ABSTRACT

A method for cleaning a solvent which may conatin hazardous particulate material which comprises liquid and vapor portions which are being recirculated in a closed system. Suspended particulate material is filtered out of the liquid. Dissolved particulate material is removed by distilling the liquid. The vapor is condensed and combined with the clean liquid. A portion of the vapor is recirculated. The solvent may be cleaned and recirculated continuously.

10 Claims, 1 Drawing Sheet

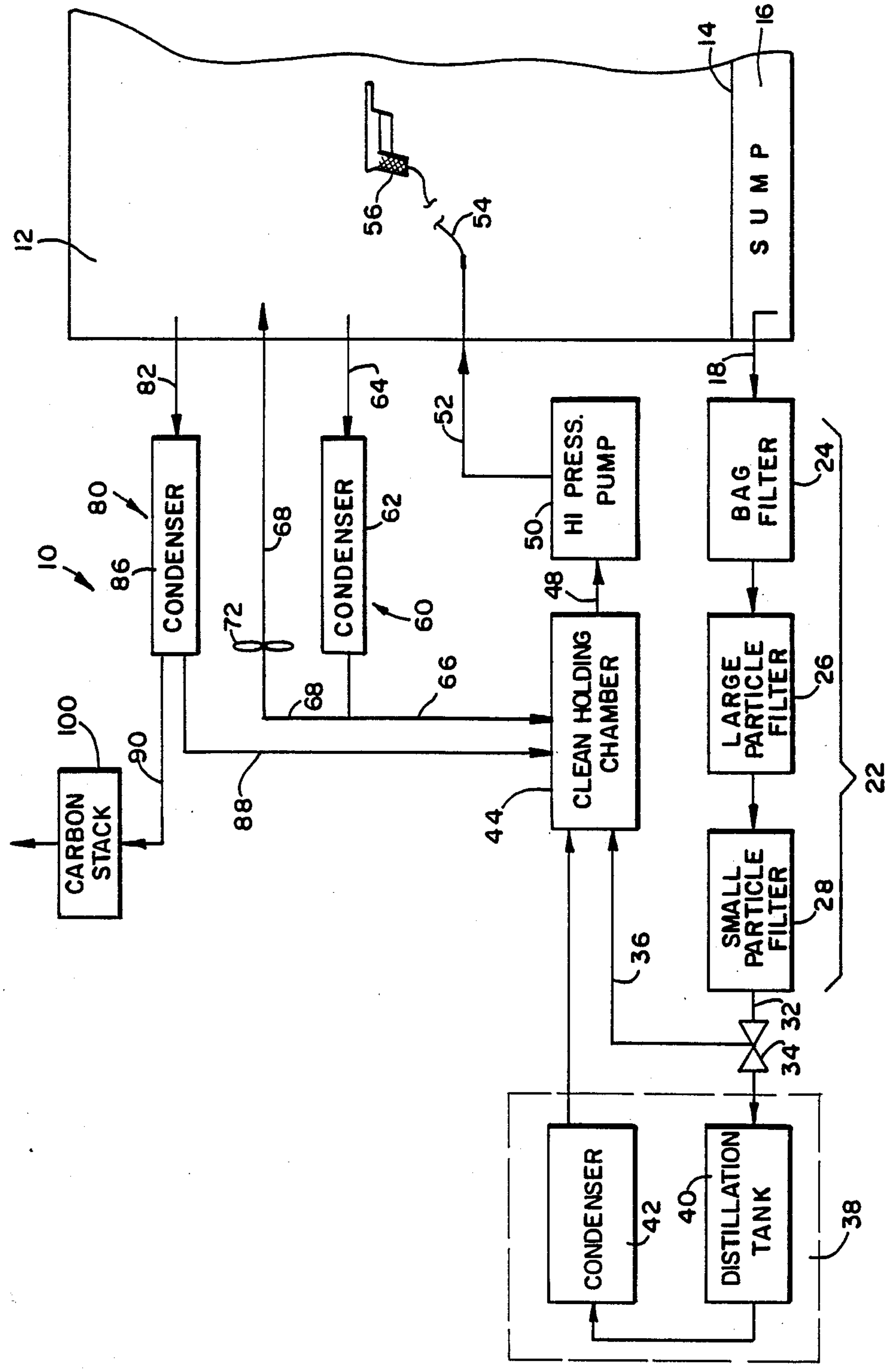
SUMP
HI PRESS. PUMP
BAG FILTER
CONDENSER
CONDENSER
CLEAN HOLDING CHAMBER
LARGE PARTICLE FILTER
SMALL PARTICLE FILTER
CARBON STACK
CONDENSER
DISTILLATION TANK
10
12
14
16
18
22
24
26
28
32
34
36
38
40
42
44
48
50
52
54
56
60
62
64
66
68
72
80
82
86
88
90
100

METHOD FOR RECOVERING SOLVENT

This is a division of application Ser. No. 832,491 filed Feb. 21, 1986 now U.S. Pat. No. 4,770,197.

BACKGROUND OF THE INVENTION

1. Field Of The Invention

This invention relates to a method and apparatus for removing hazardous particulate material from a recirculating solvent which is used in an article cleaning system.

2. Description Of The Prior Art

When solvents are used to remove hazardous particles from articles, the articles and the solvents must be isolated from the operators and the environment lest the operators be injured by exposure to the solvent or to the particulate material. it is not desirable to permit spent solvent to drain in an uncontrolled fashion from the system since the hazardous material which is entrained in the solvent will contaminate everything that comes in contact with it. Accordingly, when removing hazardous particulate material such as radioactive particles and the like, it is desirable that the solvent be cleaned and recirculated for reuse rather than be discharged from the system while the radioactive material is contained therein.

A solvent such as trichlorotriflouroethane which is sold under the trademark FREON TF or FREON 113 is particularly suitable for cleaning articles. Since it boils at temperatures just above room temperature, it can be easily cleaned by distillation.

With the foregoing in mind, it would be desirable to have an efficient and reliable method and apparatus for recovering solvent from a cleaning chamber and removing the particles of hazardous material which are suspended or disolved in the solvent so that the solvent can be reused.

Additionally, it is advantageous to have a system where the solvent can be recovered continuously as it is being recirculated.

Still further, it would be desirable if such a system included a means for storing solvent when the apparatus is not in use and in which the stored solvent is free of hazardous particulate material.

Typical devices of the prior art which are used for cleaning materials which may be coated with hazardous particulate material are shown in U.S. Pat. No. 4,443,269 which issued on Jan. 22, 1981, to Joseph A. Capella and David E. Fowler and U.S. Pat. No. 4,235,600 which issued on Nov. 25, 1980, to Joseph A. Capella and Dennis R. Morrison.

SUMMARY OF THE INVENTION

Briefly, the present invention relates to a method for cleaning a solvent which is being used in a recirculating system in which the solvent is used for removing hazardous particulate material from items and in which the solvent comprises both a vapor portion and a liquid portion. The method includes the steps of removing the hazardous particulate material from the liquid portion of the solvent, condensing the vapor portion of the solvent to a liquid, recirculating a portion of the solvent vapor through at least a portion of the system, venting ambient gases from the system while removing the solvent vapor, and selectively storing the filtered liquid solvent and the condensed solvent vapor so that the hazard presented to personnel operating the closed system by residual contamination of the stored solvent is minimized, or recirculating it through the system.

Further, the invention relates to an apparatus for cleaning a solvent which comprises liquid and vapor portions which have been contaminated with hazardous particulate material. The apparatus includes a closed chamber in which the solvent is used to remove hazardous particulate material from articles. Means are provided for continuously removing the liquid portion of the solvent from the closed chamber and removing substantially all of the hazardous particulate material therefrom and then transferring it to a holding chamber. The apparatus also includes means for removing the vapor portion of the solvent from the chamber, condensing it and returning it to the holding chamber.

BRIEF DESCRIPTION OF THE DRAWING

The invention may be better understood, and further advantages and uses thereof are readily apparent, when considered in view of the following detailed description of exemplary embodiments, taken with the accompanying drawing in which:

FIG. 1 is a schematic drawing of a presently preferred form of the invention.

DESCRIPTION OF THE PREFERRED EMBODIMENTS

Referring now to FIG. 1, and apparatus 10 comprising a presently preferred form of the method and apparatus of the invention is shown.

The apparatus is connected to a cleaning chamber 12. The cleaning chamber may be a large sealed structure having suitable supports for the article to be cleaned and windows or the like so that its interior can be observed. The bottom of the cleaning chamber 12 may be provided with a suitable means defining a macro filter for capturing large items such as nuts, bolts, screws and parts if they fall from the article being cleaned so they will not be entrained in the liquid solvent stream. A suitable means may be a screen or grate 14.

The bottom of the chamber 12 may contain a sump 16 in which liquid solvent that has been contaminated is collected.

Since a solvent such as that presently preferred is highly volatile even when it is used to remove nonhazardous particulate material, a substantial amount of solvent can be lost if the vapor is permitted to escape. Accordingly, it is essential that the solvent recovery system and the cleaning chamber 12 be closed.

Cleaning is accomplished by the discharge of a liquid solvent at high pressure onto the surface of the article which is to be cleaned and by the application of solvent vapor to its surface.

Since the solvent is sprayed from a nozzle at high pressure, the drop in pressure as the solvent leaves the nozzle causes a portion of it to vaporize. Thus, in addition to the liquid solvent, the environment inside the cleaning chamber also containes a solvent vapor.

The solvent recovery method and apparatus recaptures both the vapor portion of the solvent and its liquid portion. It reconstitutes them both so that they can be used repeatedly before being discarded.

The presently preferred apparatus which accomplishes the method comprises a conduit 18 which may include a suitable low pressure pump (not shown) for removing contaminated liquid solvent from the sump 16 of the cleaning chamber 12. The pump forces the contaminated liquid through a plurality of microfilters 22 which remove substantially all of the particulate material suspended in the solvent.

To this extent, it is presently preferred that three filters of gradually increasing filtration capability be used.

The first filter may be a "bag" filter 24 of a type which is well known in the industry. Typically, the bag filter is capable of removing those suspended particles which are greater than about fifty microns in size.

The bag filter 24 is connected to a second filter 26 which may be arranged to remove particles having a size larger than about five microns.

Filter 26 may be connected to a small particle filter 28 which has the capability of removing suspended particles having a size larger than about one micron.

The small particle filter 28 may be connected by conduit 32 containing valve 34 to a suitable still 38. Valve 34 is for diverting the flow of liquid from still 38 to conduit 36 as will be more fully explained herein. The still 38 may comprise a distillation tank 40 which is adequate in size to continuously vaporize the liquid solvent which has passed through the filter system 22 and a condensor 42 for returning the solvent vapor to a liquid form. The condensor 42 may be connected to the inlet of a holding chamber 44 in which clean liquid solvent may be stored. The outlet of the holding chamber 44 comprises a conduit 48 which is connected to the inlet of a high pressure pump 50. The pump which preferably has the ability to discharge liquids at pressures up to about 2,500 PSI is connected by a conduit 52 which extends through the wall of the cleaning chamber 12 and a flexible hose 54 to nozzle 56.

Conduit 36 which is disposed between valve and holding chamber 44 enables the liquid solvent to be transferred directly from filter 28 to the holding chamber 44 without passing through still 38.

The portion of the solvent which has vaporized is removed from the cleaning chamber 12 at two locations near its upper portion. Each location is a part of its own vapor recovery system. The lower vapor recovery system 60 comprises a condenser 62. The condenser is connected to the interior of the chamber 12 by a conduit 64. The outlet of the condenser 62 is connected by conduit 66 to the holding chamber 44 so that the condensed solvent will return to the holding chamber 44 and be mingled with solvent liquid which is entering the holding chamber from filter 38 or still 38.

The outlet of condenser 62 is connected by way of conduit 68 to the interior of the chamber 12. A fan 72 or other suitable means may be located in conduit 68 in order to urge the uncondensed vapor through the condenser 62. Additionally, the fan 72 also tends to balance the sudden increase in pressure inside the chamber when the nozzle 54 is first actuated. The increase in pressure results from the above mentioned vaporization of the solvent as it is dispensed from the nozzle 54.

The upper vapor recovery system 80 includes a conduit 82 connecting the interior of chamber 12 to a condenser 86. Conduit 82 is disposed above conduit 64. The condensed vapor is conveyed from the condenser 86 to the holding chamber 44 by way of a conduit 88.

The remainder of the uncondensed vapor is transmitted by way of a conduit 90 to an activated carbon stack filter 100 which traps the balance of the vapors and permits other harmless gases such as air and the like which are entrained in the vapor to be emitted to the atmosphere.

To use the solvent recovery system, it is connected to a cleaning chamber 12 by conduits 18, 52, 64, 68 and 82. The holding chamber 44 is filled with a suitable solvent such as FREON TF or FREON 113. The article to be cleaned is placed in the cleaning chamber 12. The cleaning chamber is then sealed. The operator, by using suitable rubber gloves or the like that are mounted in ports in the side wall of the chamber, can manipulate nozzle 56 to bring the stream of solvent emanating from high pressure pump 50 into contact with the article to be cleaned. Fan 72 in the lower vapor recovery system 60 is energized when the high pressure pump 50 is energized to compensate for the sudden increase in air pressure which results from the release of liquid from nozzle 56. The liquid portion of the solvent will be collected in sump 16 as it runs off the article being cleaned. Large items such as nuts, bolts, screws and the like will be collected at the bottom of the cleaning chamber on macro filter 14. The liquid will pass through the macro filter 14 into sump 16. Continuously operating pumps (not shown) will force the contaminated solvent through filters 24, 26 and 28 to progressively remove smaller and smaller particles of hazardous material from the solvent. The still 38 can be operated continuously during the cleaning process so that the particles which are not removed by filter 28 can be removed in the distillation tank 40. Thus, the liquid which is formed in condenser 42 is clean and can be continually reused.

The solvent vapor in the cleaning chamber is collected in the lower and upper vapor recovery systems 60 and 80.

Vapor which is collected in the lower vapor recovery system 60 is continuously condensed and returned to the holding chamber 44. To the extend that the vapor is not condensed, it and the air which is mixed with it are returned by fan 72 and conduit 68 to the cleaning chamber 12.

The balance of the vapor and entrained air are removed from the cleaning chamber 12 through conduit 82. Condenser 86 condenses a major portion of the solvent vapor. IT is returned to the holding chamber 44 by conduit 88. The remainder of the solvent vapor and air mixture is transferred by conduit 90 to activated carbon stack 100. The carbon stack 100 absorbs the remainder of the solvent vapor while permitting the air which is now harmless to be vented.

All of the solvent in the holding chamber 44 is clean and is recirculated by pump 50 through nozzle 56 into the cleaning chamber 12.

It should be noted that by operating the still 38 on a continuous basis rather than on a batch basis, only a minimum amount of solvent need be used since it is constantly being recirculated.

Additionally, it should be noted that the holding chamber 44 only contains solvent from which the hazardous particulate materials have been removed. Thus, when the solvent is being used to remove radioactive particles from articles, the health risk attendant storing radioactive material in the holding chamber is eliminated. Thus, the apparatus is safe to use for extended periods of time.

Still further, a more complete recirculation of the vapor portion of the solvent is accomplished in a large chamber 12 by virtue of the plurality of solvent vapor recovery systems. Thus, while in the present form of the invention two such systems are contemplated, it is apparent that additional recovery systems having the design of lower system 60 or upper system 80 could be employed if desired.

Thus, while the invention has been described with respect to a particular method and a particular apparatus, it is apparent that other forms of the inventive method and apparatus can be employed to achieve the intended result. Thus, the scope of the invention should not be limited by the foregoing description, but, rather, only by the scope of the claims appended hereto.

We claim:

1. A method comprising cleaning a solvent which is being recirculated in a closed system where said solvent comprises a liquid portion and a vapor portion in which ambient gases may be entrained, and wherein said solvent may contain hazardous particulate material, including the steps of removing said particulate material from said liquid portion, condensing at least a portion of said solvent vapor to a liquid, recirculating an uncondensed portion of said solvent vapor through at least a portion of said system, venting said ambient gases from said system while removing said solvent vapor and said particulate material therefrom, and selectively storing or recirculating said filtered liquid solvent and said condensed solvent vapor.

2. The method as defined in claim 1 wherein the step of removing said particulate material from said liquid includes the steps of passing said liquid solvent through a plurality of filters to remove substantially all of said particulate material therefrom, and distilling said filtered solvent to remove the remainder of said particulate material therefrom.

3. The method as defined in claim 1 including the step of continuously distilling said liquid solvent as it is being recirculated through said system.

4. The method as defined in claim 1 including the steps of providing a cleaning chamber in said system, removing said vapor portion of said solvent from the upper part of said cleaning chamber, and removing said liquid portion of said solvent from the lower portion of said cleaning chamber.

5. The method as defined in claim 4 including the step of condensing at least a portion of said removed solvent vapor and conducting another portion of said and said ambient gases are vented.

6. The method as defined in claim 1 including the step of providing a cleaning chamber in said system, removing said solvent vapor from the upper part of said cleaning chamber at first and second spaced vertical locations, removing solvent liquid from the lower part of said cleaning chamber, and recirculating a portion of said removed solvent vapor into said cleaning chamber.

7. The method as defined in claim 6 wherein said recirculation of said vapor includes the step of condensing at least a portion of said vapor.

8. The method as defined in claim 7 including the step of providing a means for urging the recirculation of said vapor.

9. The method as defined in claim 1 wherein said particulate material is hazardous and the hazard presented to personnel operating said closed system by residual contamination of said solvent by said hazardous particulate material is minimized.

10. The method as defined in claim 1 wherein said material is radioactive and the hazard presented to personnel operating said closed system by residual contamination of said solvent by said radioactive material is minimized.

* * * * *